April 6, 1937.  A. P. JORGENSON  2,076,275
ELECTRIC FLASHER
Filed Jan. 14, 1935   2 Sheets-Sheet 1
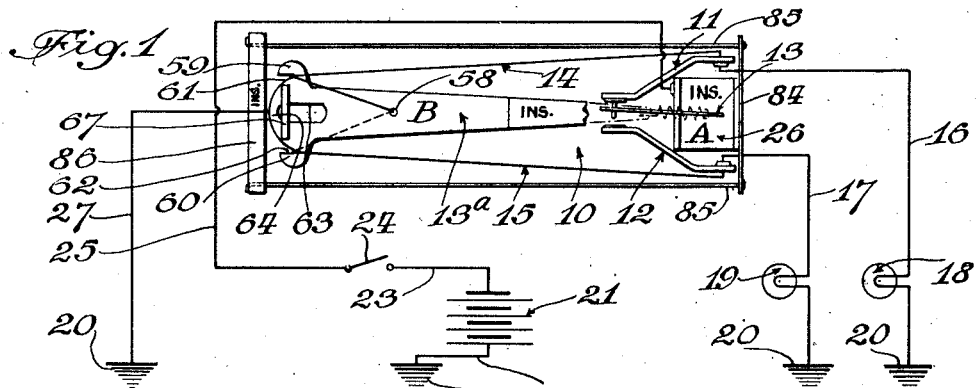
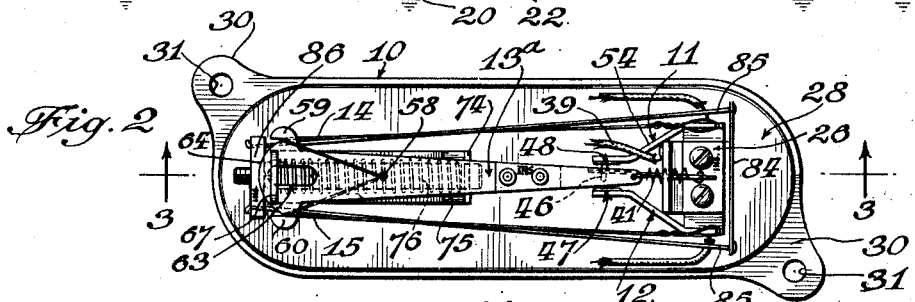
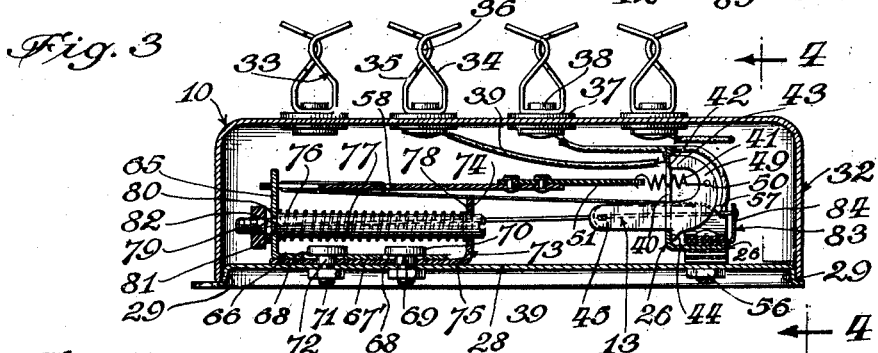
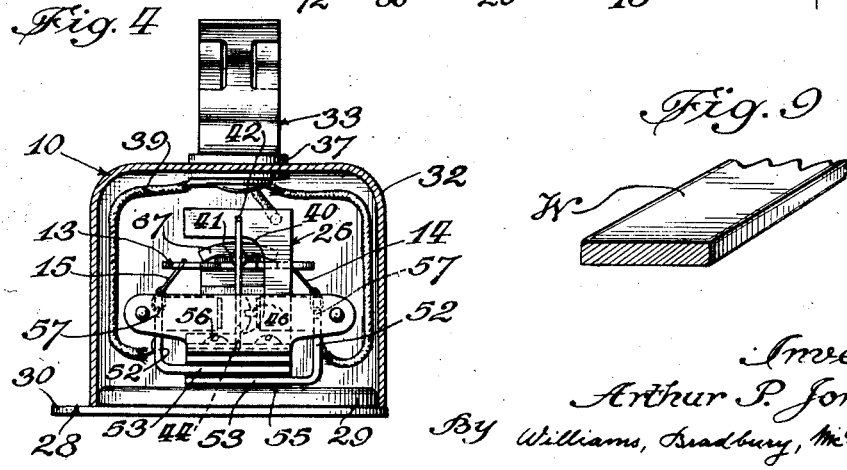
Inventor:
Arthur P. Jorgenson
By Williams, Bradbury, McCaleb + Hinkle
Attys.

April 6, 1937. A. P. JORGENSON 2,076,275
ELECTRIC FLASHER
Filed Jan. 14, 1935 2 Sheets-Sheet 2
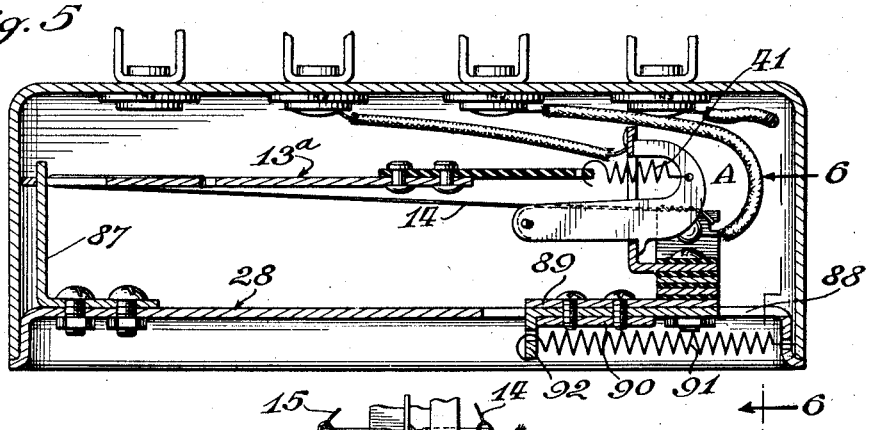
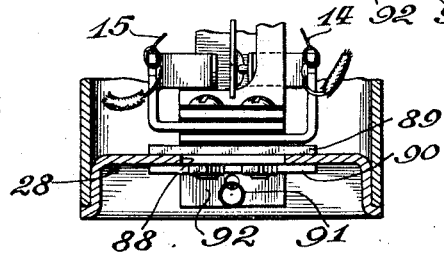
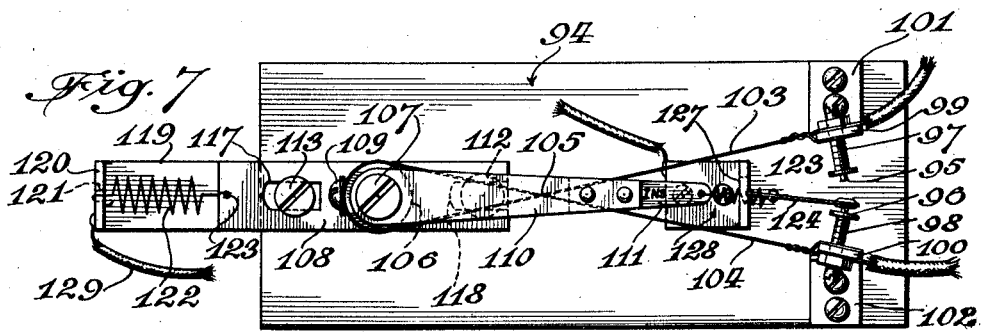
Inventor:
Arthur P. Jorgenson
By Williams, Bradbury, McCaleb & Hinkle
Attys.

Patented Apr. 6, 1937

2,076,275

UNITED STATES PATENT OFFICE 2,076,275

ELECTRIC FLASHER

Arthur P. Jorgenson, Racine, Wis., assignor to Roan Mfg. Co., Racine, Wis., a corporation of Wisconsin Application January 14, 1935, Serial No. 1,663

4 Claims. (Cl. 177—339)

The present invention relates to electric flashers, and is particularly concerned with switching devices adapted to be used for periodically and/or alternately flashing on and off the stop signal lights of an automotive vehicle.

The periodic switching device itself is capable of general application, and may be utilized wherever the characteristics of such a switching device render it useful.

One of the objects of the invention is the provision of a simple and economical device which is adapted alternately to switch on and off the stop signal lights of an automobile. Such stop signal lights are not forcibly brought to the attention when they are connected for steady illumination for the reason that the persons observing the lights soon become used to the presence of the stop lights and are apt to confuse them with ordinary tail lights.

Another object of the invention is the provision of a flashing device including an electrically heated expansible wire which is adapted to have substantially constant characteristics with respect to the action of the wire over a long period of time.

When a stop signal is flashed on and off periodically and frequently, as it is by means of the present device, the stop signal takes on the character of a moving or changing object, and it is constantly called to the attention of any one observing the stop signal light, who cannot confuse it with a steadily burning tail light. This principle has been employed in the use of the present device, where the stop lights are preferably so connected that when one stop light is on the other is off and the lights are alternately and periodically turned on and off.

In the devices of the prior art, complicated circuits have been required to accomplish this result, and auxiliary relays have always been necessary, whereas in the present device all of the switching is accomplished by means of one simple device, which itself is actuated by energy derived from the same source of current as the lights.

Another object of the invention is the provision of a flasher of the class described, which is adapted to be operated for a long period of time without necessity for repair or readjustment, and which may be manufactured at a very low cost.

Another object of the invention is the provision of an improved flasher of the class described, the periodicity of which may be easily adjusted so as to flash at short or long intervals of time.

Another object of the invention is the provision of an improved switching device of the class described in which the switch arm is so arranged that a quick make and a quick break is accomplished, and so that the thermostatic elements which are employed may be supported and connected to the fixed contacts and still kept in taut condition by virtue of the resilient connection between the switching unit and the thermostatic unit.

Other objects and advantages of the invention will be apparent from the following description and the accompanying drawings, in which similar figures represent similar parts throughout the several views.

Referring to the two sheets of drawings accompanying the specification, Fig. 1 is a diagrammatic view of the flasher in connection with a wiring diagram of the circuit employed in its use;

Fig. 2 is a top plan view of the flasher with the cover removed;

Fig. 3 is a vertical sectional view taken on the plane of the line 3—3 of Fig. 2, looking in the direction of the arrows, with the cover applied to the flasher;

Fig. 4 is a vertical sectional view taken on the plane of the line 4—4 of Fig. 3;

Fig. 5 is a vertical sectional view similar to Fig. 3 of a modification;

Fig. 6 is a fragmentary sectional view taken on the plane of the line 6—6 of Fig. 5, looking in the direction of the arrows, showing the details of support of a movably mounted switch unit;

Fig. 7 is a top plan view similar to Fig. 2 of a modification;

Fig. 8 is a side elevational view of the modification of Fig. 7, in partial section, to show the details of support of the left end of the mechanism.

Fig. 9 is a cross-sectional view taken through the wire W which is used for the thermostatic element, showing the preferred section of wire which is adapted to give the device the characteristic of constant action of the wire without stretching over a long period of time.

Referring to Fig. 1, this is a wiring diagram showing the application of a flasher of the present type to the stop lights of an automotive vehicle. The flasher is indicated in its entirety by the numeral 10. It is provided with a pair of fixed contact arms 11, 12 and a movable switch arm 13, all forming a part of a switch unit A. It is actuated by a force-multiplying arm 13a, which is pivotally mounted upon a supporting framework, and which in turn is actuated by the thermostatic elements or wires 14, 15.

The fixed contact arms 11 and 12 are connected through the conductors 16 and 17 respectively to the red stop lights 18 and 19 respectively, which are usually disposed one at each side of the vehicle at the rear. The other terminals are respectively connected to ground, designated in every case by the numeral 20.

One pole of the energizing battery 21, which is the usual wet battery for an automotive vehicle, is connected by conductor 22 to ground, and the other pole is connected by conductor 23 to the stop switch 24, usually actuated by the brake pedal. The other terminal of the stop switch 24 is connected by conductor 25 to the insulated stirrup 26 which supports the switch arm 13, and which is thus electrically connected to the switch arm 13.

The thermostatic unit B is supported on an insulating base, but is connected to ground by means of the conductor 27 and the circuit from the force-multiplying arm 13a, and conductor 27 is completed back to the contact arms 11 and 12 through the wires 14 and 15.

Referring now to Figs. 2 to 4, the flashing device itself is preferably mounted upon a supporting base 28, which may be a stamped sheet metal part of oblong shape, having an upwardly extending boss on the major portion of its area, the boss being defined by the upwardly extending flanges 29.

The base 28 is provided with one or more attaching flanges 30 having apertures 31 for suitable securing devices. The device is also provided with a housing or cover 32 comprising a stamped sheet metal member which is substantially rectangular in elevation and oblong in plan, fitting upon the boss, which is defined by the vertically extending flanges 29.

The cover 32 preferably supports a plurality of electrical connectors 33, preferably of the type having a pair of metal arms 34, 35, which are resilient and which tend to spring apart to grasp an electrical conductor which is inserted in the loop 36.

The connectors 33 may be insulated from the cover 32 by a plurality of fiber discs 37 and by a suitable sleeve surrounding the rivet 38, and preventing metallic contact with cover 32.

In some embodiments of the invention all of the connectors 33 may not be utilized, depending upon the circuits employed, but any of the elements of the device which are to be connected with outside circuits are preferably connected by suitable flexible electrical conductors 39 to the connectors 33.

The base 28 supports the switch unit A and the thermostatic unit B in such manner as to permit adjustment of the contacts to change the periodicity of the device and adjustment of the tension on the thermostatic wires for the same purpose.

The switch unit A comprises a suitable insulated bracket 26, having a horizontally extending attaching flange and an upwardly extending body adapted to pivotally support the switch arm 13. For this purpose the bracket 26 may be formed with an aperture 40 which is adapted to leave the major portion of the vertical area of the bracket 26 open for the passage of the spring 41 and the switch arm 13.

Bracket 26 may be provided with knife edge grooves 42, one above and one below the opening 40, and extending in a vertical direction, for receiving the knife edges 43, 44 which are formed on the left hand side of the upwardly and downwardly projecting portions of the switch arm 13.

At the left end or extension 45 of the switch arm 13 there are provided a pair of contacts 46, one on each side of the switch arm, and adapted to engage suitable fixed contacts 47, 48 carried by the contact arms 11, 12. All of these contacts may be made of any suitable material adapted to carry the requisite amount of current without burning, but I prefer to utilize copper or german silver for this purpose.

The switch arm 13 of this embodiment is preferably provided with upwardly curved extension 49, having an aperture 50 about midway between the top and bottom for the reception of the hooked end of the spring 41. The spring 41 has its opposite end hooked in an aperture located in the insulating fiber extension 51 of the multiplying arm 13a.

The fixed switch arms 11 and 12 comprise sheet metal members similar in shape but oppositely arranged for left hand or right hand contacts. Each fixed switch arm 11 or 12 has a vertically extending portion 52 and a horizontally extending attaching flange 53. At the top, each of these switch arms has a laterally and inwardly extending portion 54 to bring the contacts 47 or 48 into close juxtaposition with the movable contacts 46.

The extreme ends of the fixed switch arms 11 and 12 extend parallel to each other and support the fixed contacts 47 and 48. The attaching flanges 53 of the fixed switch arms 11 and 12 and the bracket 26 are all spaced from each other by layers of insulation 55 and all are secured to the base 28 by a bolt or rivet 56.

The rivet 56 is also insulated from all of these metallic parts except the base 28, by reason of the enlarged apertures and/or insulating sleeves employed between the bolt or rivet 56 and the members 53, 26. The mode of insulating these parts from the base will be readily apparent to any one skilled in the art.

The upwardly extending portions 52 of the fixed switch arms 11, 12 are preferably provided with the hooks 57, which may be formed by merely slotting the right hand edge of these members. The two thermostatic elements or wires 14, 15 may then be secured to the fixed switch arms 11, 12 by twisting the loops in the ends of the wires 14, 15 and hooking the loops over the lugs or hooks 57 on the fixed switch arms 11 and 12. The thermostatic wires 14 and 15 are preferably formed of nichrome wire, that is, a wire having nickel and chromium as its principal constituents and adapted to have a relatively large heat coefficient of expansion.

While these thermostatic elements 14 and 15 have been referred to as two wires, they are in fact but the ends of a single wire portion which may extend as shown in Fig. 1, and will be described in detail in connection with the thermostatic unit B.

The thermostatic unit B preferably comprises a relatively long multiplying arm 13a having an insulating extension of fiber or other insulating plate 51, secured at its right end by a plurality of rivets or other fastening means. The arm 13a may consist of an elongated plate of metal having an aperture 58 for passage of the wire 14, 15 and having a pair of rearwardly extending lugs 59, 60, each located outside of the grooves 61, 62 respectively.

The grooves 61, 62 provide a bearing surface for the wire 14, 15 on the arm 13, and in connection with the aperture 58 permit the force or tension on the wire portions 14, 15 to become substantially balanced when the wires are of the same temperature. However, the set of the wire and/or the friction of contact between the wire and the arm 13a at the grooves 61, 62 and aperture 58 are such that when one of the wire portions 14, 15 is heated in a relatively short time there is no substantial slippage between the wire portions and the multiplying arm 13a, and the arm is pulled to one side, due to the expansion of the heated wire.

In some embodiments of the invention, after the tension has been adjusted on the wire portions 14, 15 and has become balanced between the two wire portions at the same temperature by means of slippage of the wire with respect to the arm 13a, further slippage may be prevented by means of a suitable clamping member such as described in connection with Figs. 7 and 8.

The details of support of the multiplying arm 13a and for placing tension on the wire 14, 15 will now be described in detail. The multiplying arm 13a is also provided with an elongated aperture 63 at the left end of Fig. 1, the aperture 63 being provided with a curved end surface 64 for sliding engagement with the vertically extending stem 65 of a bracket, indicated in its entirety by the numeral 66. At its upper end the stem 65 is substantially T-shaped, having a transversely extending portion 67 which is adapted to pass through the aperture 63 in the assembly of the arm 13a with the bracket 66, but the transverse portion 67 retains the arm 13a on the stem 65 when the arm 13 is rotated to the position of Fig. 1.

The bracket 66 has a horizontally extending attaching flange 67', which is provided with oblong apertures 68. The apertures 68 are of sufficient size to pass the bodies of the screw bolts 69, but will not pass the heads 70 thereof, the heads engaging the top of the flange 67' so that the bracket 66 is supported for horizontal sliding movement on the bolts 69. Each of the bolts 69 is provided with a reduced threaded portion 71 which passes through a suitable aperture in the base 28, and the annular shoulder 72 determines the final position of the bolts 69 when the nut is threaded home.

Another angle bracket 73 has a vertically extending flange 74 and a horizontally extending attaching flange 75. The attaching flange 75 is fixedly secured to base 28 by the bolts 69 passing through suitable apertures in flange 75. The length of the bodies of the bolts 69 is such that the bracket 66 is mounted for relatively free straight line sliding movement. Bracket 66 is preferably urged or biased toward the left or away from the switch unit A by means of a compression spring 76. Compression spring 76 may consist of a helical spring which is confined between the vertically extending flanges 65 and 74, and the spring is preferably mounted upon a rod 77 which is slidably mounted in an aperture 78 in flange 74. The opposite end of the rod or plunger 77 is provided with a reduced threaded portion 79 which passes through an aperture 80. A nut 81 may clamp the flange 65 between the nut and the annular shoulder 82, thereby fixedly securing the plunger rod 77 to the bracket 66.

Since the multiplying arm 13a is attached to the thermostatic wires 14, 15, the arm, being pivotally mounted on the vertically extending stem 65 of bracket 66, the arm is mounted for sliding movement toward the right or left in Fig. 2, and the compression spring 76 urges the thermostatic assembly toward the left, placing a tension on the wire portions 14, 15.

Another feature which may be employed in some embodiments of the invention, but which need not necessarily be utilized in every embodiment, comprises the safety switch 83 which is adapted to place both lights on the circuit and illuminate both lights 18, 19 in case of breakage of the wires or any other part of the flasher.

This safety switch comprises a resilient metal switch arm having a horizontal portion which is secured to it but insulated from the base 28 by the same bolt 56. A vertically extending bridging portion 84 is of sufficient length horizontally to reach between the right ends of the fixed switch arms 11 and 12. The bridging member 84 may extend beyond the switch arms for attachment of a pair of connecting wires 85, the ends of which pass through apertures in the bridging contact 84 and which are bent over or riveted. The opposite ends of the wires 85 pass through apertures in a fiber insulating plate 86 where they are likewise bent over so as to transmit a pull from the plate 86 to the bridging contact 84.

Plate 86 may be provided with a threaded aperture for receiving the end of the reduced threaded end 79 of plunger rod 77 so that the plate 86 moves with the bracket 66, which places the tension on the wires 14, 15. In case of breakage of either of the wires 14, 15, the plunger assembly 77, 66 would move toward the left in Fig. 3, disabling the switch against further periodic action, but insulating plates 86, and wires 85 would draw with them the bridging contact 84 into contact with the fixed contact arms 11 and 12.

A circuit would then be established from ground 20, conductor 22, battery 21, conductor 23, 25, switch arm 13, contact arm 11 or 12, bridging contact 84, back through both conductors 16, 17 and lamps 18, 19 to ground 20.

This bridging contact 84 would thus illuminate both the lamps in case of breakage of the flasher.

The contact 84 may also be so arranged that it is not insulated from the bracket 26, thus placing it in position to be independent of the movement of the switch arm 13, and permanently energizing lights 18 and 19.

The operation of the embodiment of Figs. 1 to 4 is as follows: When the circuit is closed at the brake pedal stop switch 24 a circuit is completed through one of the lights 18 and 19, depending upon the position of the switch 13. As shown in Fig. 1, the circuit would be completed through the switch arm 11 and switch 13 to illuminate the lamp 18, but the lamp 19 would be dark, inasmuch as it is out of the circuit. At the same time, current would pass from the fixed switch arm 11 through the thermostatic wire 14 to the metallic arm 13a, and thence back to ground and to the battery through conductor 27 so that the wire 14 would be heated by the passage of electrical current. The resulting heat causes the wire 14 to expand, and the action of the tension of the other wire 15, which is caused by spring 76, moves the multiplying arm 13a in a counterclockwise direction in Fig. 1. This carries the left end of the spring 41 past the dead center between the knife pivots 42, 44 and the right end 50 of spring 41, and the switch arm 13 is subjected to a counterclockwise upward pull at its right end in Fig. 1 by the spring 41. Contact 13 then snaps in a counterclockwise direction in Fig. 1, bringing the contacts 46, 47 into engagement and quickly breaking contact between 46 and 48.

This cuts the lamp 18 out of circuit and places the lamp 19 in circuit, and at the same time the thermostatic wire portion 14 is cut out of circuit, while the portion 15 is placed in the circuit. The wire 14 would then cool and contract, while the wire 15 is being heated by electric current and expanding, the result being that in a short interval of time the multiplying arm 13 is actuated clockwise. This action is predetermined by the characteristics of the wires 14, 15 in connection with the characteristics of the source of electricity, so that the time required for heating the wire may be accurately predetermined and thus the periodicity of the switch determined within certain limits by selection of a wire of proper size and resistance. The preferred cross sectional shape of the wires 14, 15 is shown at the section W in Fig. 9 as being in the form of a strip or ribbon. For example, in one type of flasher adapted to be used for automobile stop lights, I prefer to use a flat ribbon nichrome wire of a size of substantially .003 by .016 inches and of approximately nine inches long between its points of attachment to the fixed arm 11 and the moving arm 13. The flat ribbon wire is found to give more uniform characteristics to the device from the point of view of a constant flashing period throughout extended use, and this is attributed to the fact that the flat ribbon wire is adapted to radiate heat more quickly than the round wire. It is equally important to the action of the device that the expanded wire cool quickly as it is important that the wire be heated; that is, the wire should cool during the same period of time that is required for heating of the opposite wire, and it is found that a flat ribbon wire is not subject to elongation after a period of use, which seemed to result in the case of some of the round wire instruments.

It should be understood that a flat ribbon wire may be used in any of the devices disclosed herein, the wire being shown in the ordinary drawings as a single line on account of the smallness of the wire. Fig. 9 shows the wire magnified in size about one hundred times.

The length of period may also be adjusted by location of the fixed contacts 47, 48, the contacts being located by bending in Fig. 1 or by means of screw contacts in Figs. 7 and 8.

It should be noted in connection with the foregoing device that the spring 76 is of greater strength than the spring 41, placing a predetermined tension on the spring 41 as well as on the wires 14, 15. By virtue of the resilient connection 41 between the switching device A and the thermostatic device B these elements may be mounted for separate movement with respect to each other to maintain suitable tension upon the thermostatic wires.

The switch arms 13 and 124 may also be made of very thin flexible metal so that the flexibility of the blade will cause a wiping action between the movable and stationary contacts from which the switch operates, thereby tending to keep the contacts clean, despite arcing and oxidation.

The structure described, including the spring 76, also has the advantage that the heavier spring takes up any stretching of the thermal wires under tension and maintains the tension of these wires in spite of any stretching. The spring 76 being stronger than the spring 41, the snap action spring 41 is placed under greater tension as the switching device becomes older and the thermal wires stretch. Thus, after the switch has been in operation for some time and its contacts are more or less pitted or oxidized, the spring pressure upon the switch arm caused by spring 41 is greater than that initially used, causing a better contact and compensating for the inequalities of the contacts caused by use.

Either the contacts 11 or 12 may be mounted for sliding movement or the multiplying arm assembly 13, 66 may be mounted for sliding movement.

In the embodiment of Figs. 5 and 6, the assembly which supports the multiplying arm 13 is fixedly mounted by means of a bracket 87 carried by base 28.

The switch assembly A is fixedly secured in a slot 88 in base 28 by means of the plate 89 located above the base, and the plate 90 located below the base. A tension spring 91 carried by flange 92 has its opposite end secured to base 28, and it urges the switch assembly A toward the right in Fig. 5, thereby placing a tension upon the wire portions 14, 15. Spring 91 is, of course, of greater strength than the spring 41 which is also employed in this embodiment.

Referring to Figs. 7 and 8, this is a modification in which the base 94 comprises a member which may be made of insulation, such as a molded phenolic condensation product. The metal parts of the mechanism are supported upon this base by a plurality of screw bolts which may be passed through attaching flanges and threaded into the compound or provided with nuts on the lower side of the base. In this case a pair of fixed contacts 95, 96 are carried by threaded members 97, 98 which are supported in the upwardly extending flanges 99, 100 of the brackets 101, 102. The loops of the wire portions 103, 104 are also passed about the vertical parts 99, 100, but in this case the wire is arranged in a substantially different manner from the preceding embodiments, since the wires cross each other without contacting at 105.

The wire is wrapped about a metal drum 106 which is rotatably supported upon a screw bolt 107 carried by a metal plate 108. The wire may be further permanently secured with respect to the drum 106 by the screw bolt 109 which is threaded into the drum 106 and which clamps portions of the wire against the drum.

The drum 106 also supports for rotation with the drum a metal multiplying arm 110 having an insulating extension 111. The screw bolt 107, which provides a journal for drum 106, is adapted to move with the plate 108, which is mounted for sliding motion on a pair of screw bolts 112, 113. Each of these screw bolts is provided with a body portion 114 and the reduced threaded portion 115 so that the bolt may be driven home against the annular shoulder 116, leaving a body portion of substantially the same or slightly greater length than the thickness of the plate 108.

The plate 108 is confined against the base 94 by the heads of screw bolts 112, 113, and the plate 108 is provided with longitudinally extending slots 117, 118 for receiving the bodies 114 of bolts 112, 113. The bolts 112, 113 may be threaded into a metallic strip 119 which extends beyond the body 94 and is provided with an upwardly extending flange 120 having an aperture 121 into which the tension spring 122 is hooked. The opposite end of the tension spring 122 is hooked into an aperture 123 in the plate 108, and the relation of the parts is such that the spring 122 urges the plate 108 toward the left in Fig. 8, placing the tension on the wire portions 103, 104. The strength of the spring 122 is greater than that of spring 123, which has one end hooked in the insulating extension 111 of the multiplying arm 110 and its opposite end hooked in an aperture in the switch lever 124.

Switch lever 124 has a pair of knife edge legs 125, 126, one arranged on each side of the spring 123, and the knife edges engage grooves in the upwardly extending flange 127 of a bracket 128 carried by the base 94. Bracket flange 127 has an aperture for passing the spring 123, and the arrangement is such that whenever the point of attachment of the spring 123 to the extension 111 passes beyond the line of centers from the point of attachment of spring 123 to the lever 124 and the knife edges, the switch lever 124 snaps over to the opposite contact. The action of this embodiment is substantially the same as that previously described. When the switch lever is in engagement with the contact 96, a circuit is completed from the switch lever through the contact to one of the lights or other devices controlled, and through the contact back through one of the wire portions and the intervening metal parts to the conductor 129.

For example, in Fig. 7 the wire portion 104 would then expand, permitting the wire portion 103 to rotate the drum 106 counterclockwise, carrying the arm 110 upward in Fig. 7, and causing the switch lever 124 to snap over to contact 95.

It will thus be observed that I have invented an improved electric flasher which is adapted to operate continuously merely by the application of electric current to the flasher, the same electric source being employed for actuating the device controlled by the flasher, such as stop lights.

The present flasher operates periodically and controls the lights without the necessity for any intermediate relays. The proportions of the resistance wires which constitute the thermostatic expansible elements may be made such that the same battery which actuates the lights may be used to actuate the flasher, and the periodicity of the flashing device may be varied by changing the adjustment of the contacts or by the proportions of the parts.

When the flasher is used with stop lights, the lights will be periodically and alternately turned on and off and thereby brought forcibly to the attention of any one observing the lights. The present device may be manufactured at a very low cost so that it may be placed within the means of a large number of users, and the flasher is of general use aside from its adaptability for flashing stop lights.

While I have illustrated and described a preferred embodiment of the invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a flashing system, the combination of a pair of signal lights with a switching device having a pair of contacts, one of each of said contacts being arranged to control one of said signal lights, a switch element for engaging said contacts, a pair of thermostatic wires arranged in parallel with said signal lights and controlled by said contacts, operative mechanical connections between said switch element and said thermostatic wires whereby the expansion of one of said wires permits the other wire to throw said switch element into engagement with an opposite contact to cut the expanding wire out of the circuit and place the other wire in the circuit to be heated to effect its expansion, resilient means for placing said wires under constant tension, and a safety device comprising an auxiliary switch actuated by said resilient means for closing the circuit through both signal lights when either of said thermostatic wires is disabled.

2. In a periodic flasher, the combination of a supporting base with a switch actuating arm pivotally carried by said base, a pair of fixed switch contacts, a switch arm pivotally carried by said base and oscillatable between said contacts, one of said arms being mounted on said base for movement relative to the other arm, resilient means for connecting said arms, the pivot axis of said switch arm being between the points of connection of said resilient means to said arms, relatively stronger resilient means for urging said arms apart, and a pair of thermostatic wire portions connected to said switch actuating arm and connected to said fixed contacts to be controlled by said switch arm for connection in the circuit, said latter resilient means maintaining said wires under constant tension.

3. In a flashing device, the combination of a supporting base with a pivot bracket movably mounted on said base, a switch lever bracket mounted on said base, a switch lever pivotally mounted on said latter bracket and oscillatable between fixed contacts, a switch actuating lever pivotally mounted on said first-mentioned bracket, resilient means for connecting said levers, the line of connections of said levers to said resilient means being adapted to extend across the pivot axis of said switch lever when the switch lever is in a predetermined position, relatively stronger resilient means for urging said brackets apart, and a pair of thermostatic wires controlled by said switch lever and connected to said switch actuating lever, said wires having their ends secured to said fixed contacts for engaging said switch lever and having an intermediate portion secured to said switch actuating lever at points spaced from the center of rotation of said switch actuating lever whereby said wires move said switch actuating lever about its pivot in a direction which is determined by the connection of the wires in the circuit.

4. In a flasher, the combination of a supporting base with a pivotal mounting movably supported on said base, a switch actuating arm pivotally mounted on said mounting, a pair of tension members of electrical conducting and thermally expansible material connected to fixed switch contacts arranged on opposite sides of a switch arm, said switch actuating arm adapted to actuate the arm in either of two directions selectively, said switch arm being pivotally mounted on said base adjacent the end of said actuating arm, resilient means connected to said actuating arm and to said switch arm at a point beyond the pivots of said switch arm whereby said switch arm is moved with a snap action, and resilient means urging said mounting and actuating arm away from said switch arm to tension said thermally expansible members, said latter resilient means being of greater strength than the resilient means connecting said switch arm and actuating arm.

ARTHUR P. JORGENSON.